United States Patent
Moon et al.

(10) Patent No.: US 7,929,099 B2
(45) Date of Patent: Apr. 19, 2011

(54) LIQUID CRYSTAL DISPLAY WITH IMPROVED LATERAL VISIBILITY

(75) Inventors: Sung-jae Moon, Seoul (KR); Seung-soo Baek, Seoul (KR)

(73) Assignee: Samsung Electronics Co., Ltd. (KR)

( * ) Notice: Subject to any disclaimer, the term of this patent is extended or adjusted under 35 U.S.C. 154(b) by 577 days.

(21) Appl. No.: 11/782,974

(22) Filed: Jul. 25, 2007

(65) Prior Publication Data

US 2008/0024710 A1   Jan. 31, 2008

(30) Foreign Application Priority Data

Jul. 27, 2006   (KR) .................. 10-2006-0070935

(51) Int. Cl.
G02F 1/1343   (2006.01)
(52) U.S. Cl. ...................... 349/144; 349/141
(58) Field of Classification Search .............. 349/144
See application file for complete search history.

(56) References Cited

U.S. PATENT DOCUMENTS

2006/0087610 A1* 4/2006 Kim et al. .............. 349/144
2007/0018927 A1* 1/2007 Kim ........................ 345/92

* cited by examiner

*Primary Examiner* — Michelle R Connelly Cushwa
(74) *Attorney, Agent, or Firm* — Innovation Counsel LLP

(57) ABSTRACT

A liquid crystal display having improved response speed and greater luminance includes an intersecting array of gate lines and data lines defining a matrix of pixels, a first sub-pixel electrode connected to a first thin film transistor; a second sub-pixel electrode connected to a second thin film transistor, the second sub-pixel electrode including a pair of upper and lower electrodes disposed above and below the first sub-pixel electrode and lateral electrode disposed at one side of the first sub-pixel electrode and the upper and lower electrodes; and a connecting portion connecting the lateral electrode with each of the upper and lower electrodes, at least a portion of the connecting portion forming an angle of substantially 45 degrees or −45 degrees with respect to the gate lines.

18 Claims, 7 Drawing Sheets

LIQUID CRYSTAL DISPLAY WITH IMPROVED LATERAL VISIBILITY

REFERENCE TO RELATED APPLICATION

This application claims priority under 35 U.S.C. §119 of Korean Patent Application No. 10-2006-0070935 filed on Jul. 27, 2006, the contents of which are hereby incorporated by reference.

BACKGROUND OF THE INVENTION

1. Field of the Invention

This invention relates to a display device, and more particularly, to a liquid crystal display having improved speed of response and enhanced luminance.

2. Description of the Related Art

Liquid crystal displays (LCDs) are one of the most commonly used flat panel displays. Liquid crystal displays include two plates having a plurality of electrodes thereon and a vertical alignment mode liquid crystal layer interposed between the electrodes. Voltages applied to the two plates, control the transmittance of incident light by rearranging the liquid crystal molecules of the liquid crystal layer in which the LC molecules are aligned with their long axes perpendicular to the plates in the absence of an electric field.

The VA mode LCD has a high contrast ratio and wide reference viewing angle, which is defined as a viewing angle at which the contrast ratio equal to 1:10 or as the limit angle for inversion of luminance among the gray levels. The wide viewing angle of the VA mode LCD is achieved by cutouts in field-generating electrodes and protrusions on the field-generating electrodes. In a domain-division type LCD one pixel is divided into a pair of sub-pixels and different voltages are applied to the respective sub-pixels through switching elements formed at the respective sub-pixels yielding improved lateral visibility.

BRIEF SUMMARY OF THE INVENTION

The present invention provides a liquid crystal display which can improve a response speed while enhancing luminance.

The above and other objects of the present invention will be described in or be apparent from the following description of the preferred embodiments.

According to an exemplary embodiment of the present invention, a liquid crystal display includes: first and second gate lines separated from each other and extending in a first direction; data lines insulated from the first and second gate lines and extending in a second direction, wherein the data lines and the gate lines intersect each other; first and second thin film transistors connected to the first and second gate lines and the data lines, respectively; a first sub-pixel electrode connected to the first thin film transistor; a second sub-pixel electrode connected to the second thin film transistor, the second sub-pixel electrode including a pair of upper and lower electrodes disposed above and below the first sub-pixel electrode and lateral electrode disposed at one side of the first sub-pixel electrode and the upper and lower electrodes; and a connecting portion connecting the lateral electrode with each of the upper and lower electrodes, at least a portion of the connecting portion forming an angle of substantially 45 degrees or −45 degrees with respect to the gate lines.

According to another exemplary embodiment of the present invention, a liquid crystal display includes: first and second gate lines separated from each other and extending in a first direction; data lines insulated from the first and second gate lines and extending in a second direction, wherein the data lines and the gate lines intersect each other; first and second thin film transistors connected to the first and second gate lines and the data lines, respectively; a first sub-pixel electrode connected to the first thin film transistor and having micro-patterns formed at its edges, the micro-patterns strengthening a lateral electric field; a second sub-pixel electrode connected to the second thin film transistor and having micro-patterns formed at its edges, the micro-patterns strengthening a lateral electric field, the second sub-pixel electrode including a pair of upper and lower electrodes disposed above and below the first sub-pixel electrode and lateral electrode disposed at one side of the first sub-pixel electrode and the upper and lower electrodes; and a connecting portion connecting the micro-patterns formed at the lateral electrode with the micro-patterns formed at the upper and lower electrodes, wherein the first and second sub-pixel electrodes are shaped substantially in a zigzag pattern. A pair of gray voltage sets having different gamma curves obtained from information about an image is applied to the first and second sub-pixel electrodes which are shaped substantially in a zigzag pattern.

BRIEF DESCRIPTION OF THE DRAWING

The above and other objects, features and advantages of the present invention will become more apparent from a reading of the ensuing description together with the drawing, in which.

DETAILED DESCRIPTION OF THE INVENTION

Figure 4:
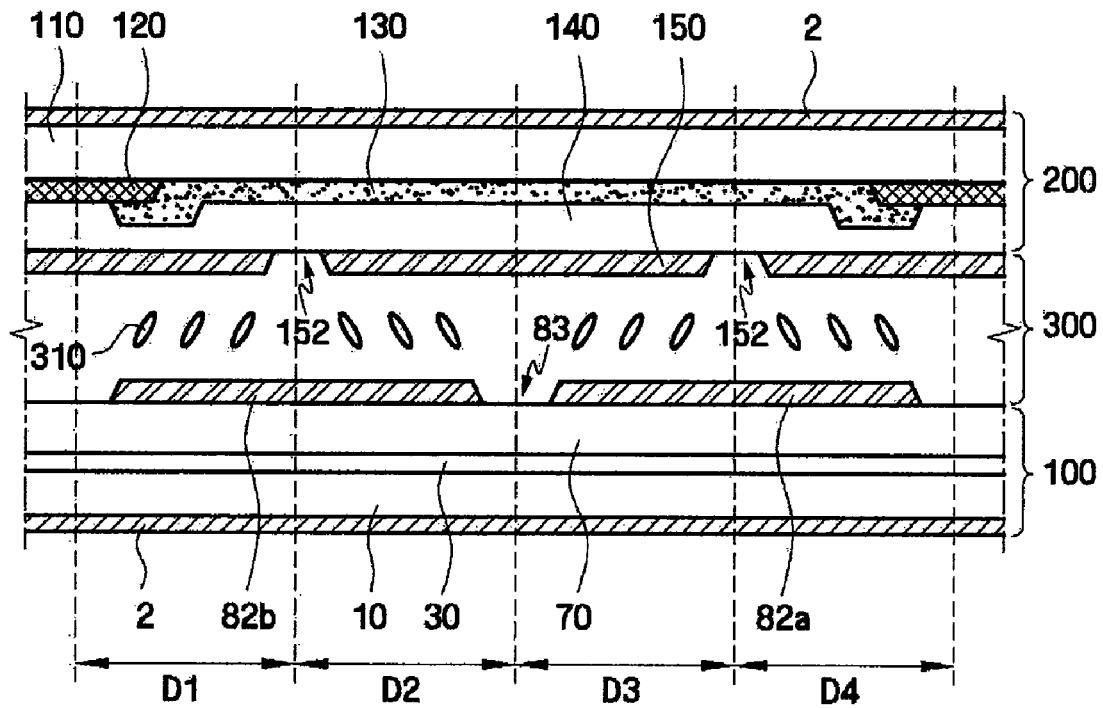
FIG. 4 is a cross-sectional view of the liquid crystal display, taken along the line IV-IV' in FIG. 3.

Referring to FIG. 4, the liquid crystal display according to an embodiment of the present invention includes a thin film transistor (TFT) array plate 100, a common electrode plate 200 facing TFT array plate 100, and a liquid crystal layer 300 having liquid crystal molecules 310 arranged such that the longitudinal axes thereof are substantially perpendicular to TFT array plate 100 and common electrode plate 200.

Figure 1A:
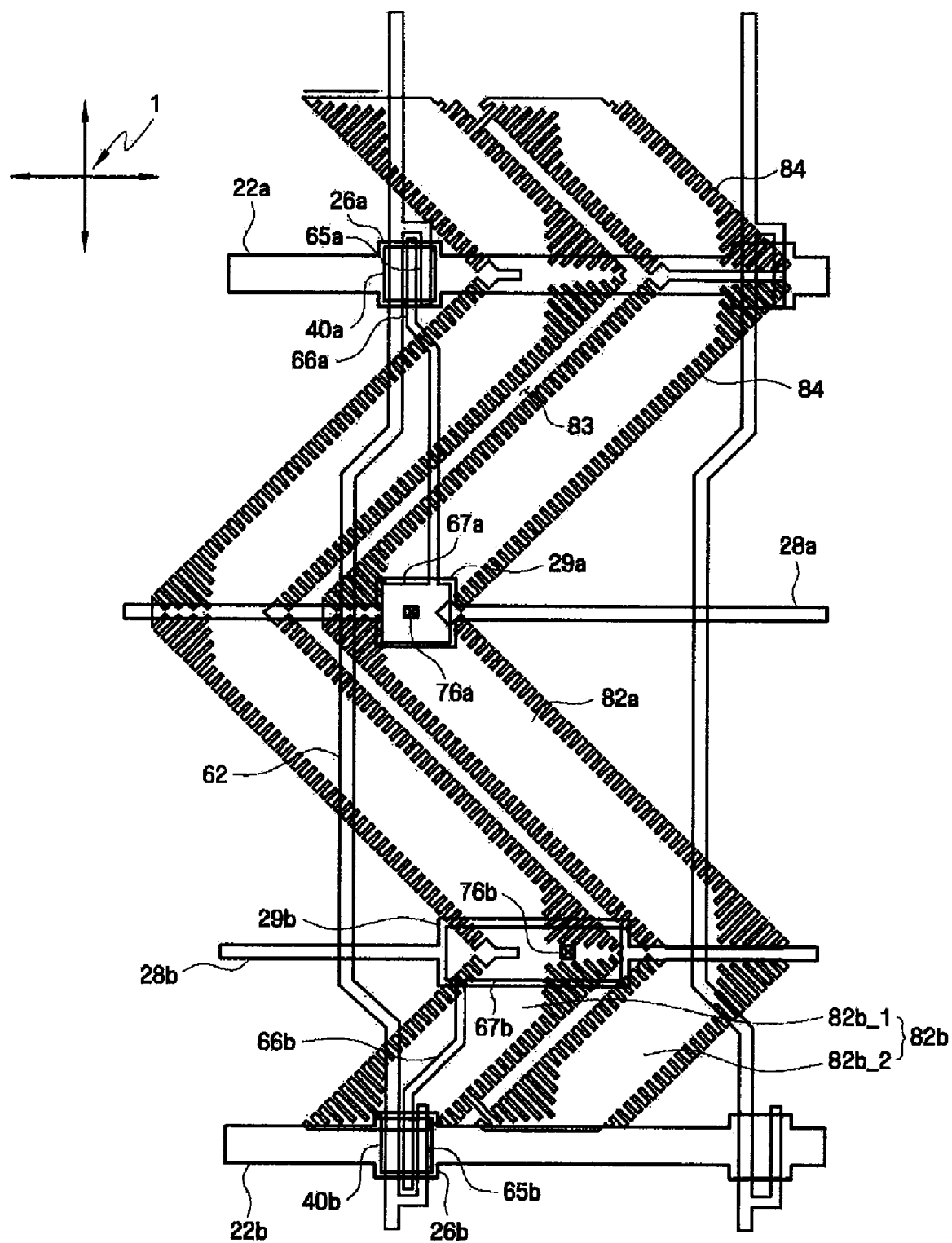
FIG. 1A is a layout diagram of a thin film transistor (TFT) array plate of a liquid crystal display according to an embodiment of the present invention.
Figure 3:
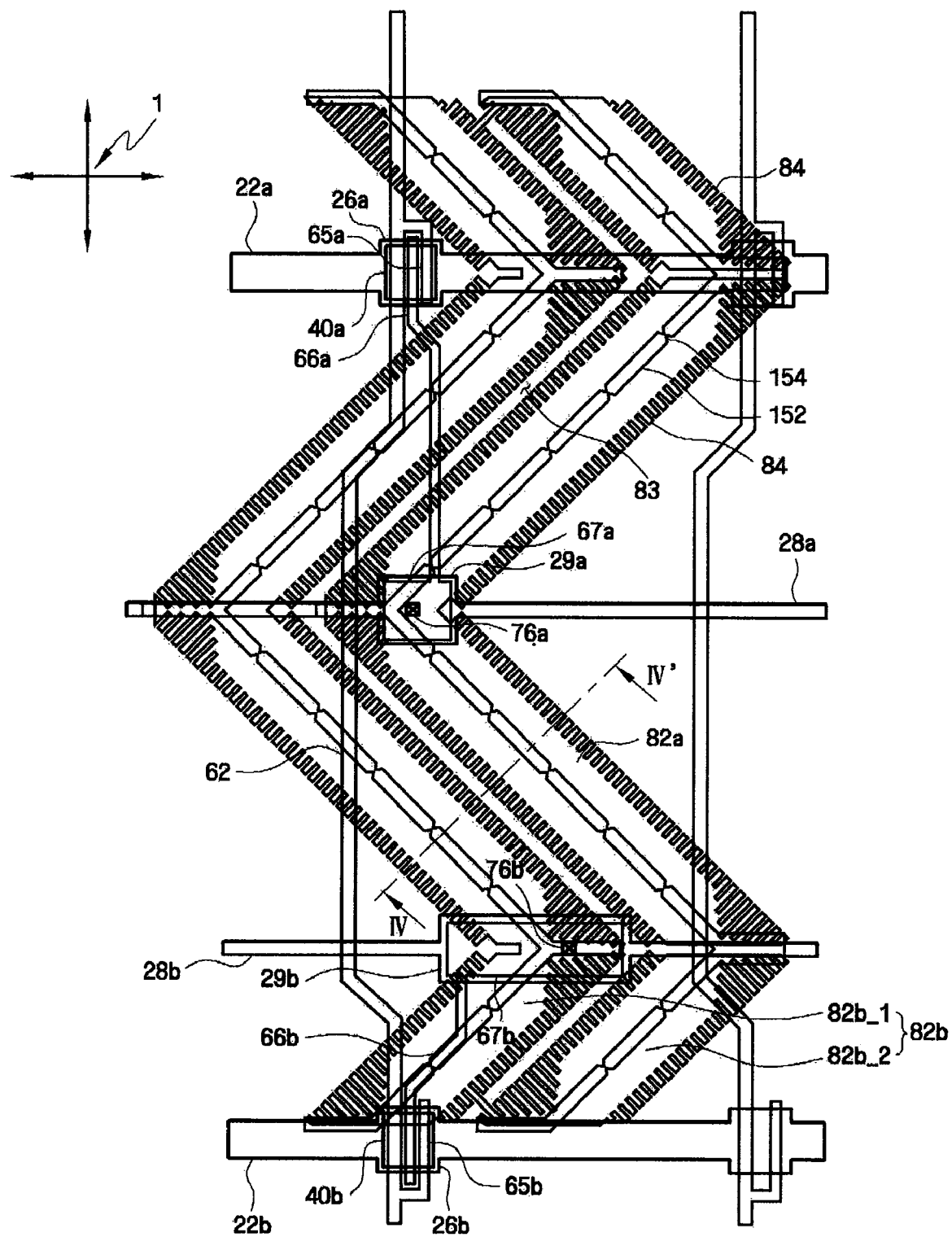
FIG. 3 is a layout diagram of a liquid crystal display including the thin film transistor (TFT) array plate shown in FIG. 1A and the common electrode plate shown in FIG. 2.

TFT array plate 100 will first be described in greater detail referring to FIGS. 1A, 3 and 4.

First and second gate lines 22a and 22b and first and second storage electrode lines 28a and 28b are formed on an insulating substrate 10 made of a transparent material, e.g., glass. Gate lines 22a and 22b extend substantially in a transverse direction, are physically and electrically separate from each other and are respectively disposed at the upper portion and lower portion of a pixel. First and second gate electrodes 26a and 26b are in the form of protrusions on gate lines 22a and 22b. Gate lines 22a and 22b and gate electrodes 26a and 26b constitute a gate wire (22a, 22b, 26a, 26b).

First and second storage electrode lines 28a and 28b extend substantially in a transverse direction across a pixel area, each line having a wider portion 29a and 29b that acts as a storage electrode, the two constituting a respective storage electrode wire (28a, 28b, 29a, 29b). The shapes and arrangements of the first and second storage electrode lines 28a and 28b and the first and second storage electrodes 29a and 29b may vary in various ways from that depicted in the drawing FIGS.

Gate wire (22a, 22b, 26a, 26b) and storage electrode wire (28a, 28b, 29a, 29b) are preferably made of an Al-containing metal such as Al or an Al alloy, a Ag-containing metal such as Ag or an Ag alloy, a Cu-containing metal such as Cu or an Cu alloy, a Mo-containing metal such as Mo or a Mo alloy, Cr, Ti or Ta. In addition, gate wire (22a, 22b, 26a, 26b) and storage electrode wire (28a, 28b, 29a, 29b) may have a multi-layered structure including two conductive films (not shown) having different physical characteristics. One of the two films is preferably made of a low resistivity metal, such as an Al-containing metal, a Ag-containing metal, and a Cu-containing metal for reducing a signal delay or a voltage drop in gate wire (22a, 22b, 26a, 26b) and storage electrode wire (28a, 28b, 29a, 29b). The other film is preferably made of a material such as a Mo-containing metal, Cr, Ta or Ti, which have good physical, chemical, and electrical contact characteristics with other materials such as indium tin oxide (ITO) or indium zinc oxide (IZO). Examples of combinations of the two films are a lower Cr film and an upper Al (Al alloy) film and a lower Al (Al alloy) film and an upper Mo (Mo alloy) film. However, gate wire (22a, 22b, 26a, 26b) and storage electrode wire (28a, 28b, 29a, 29b) may be made of various other metals or conductors. A gate insulating layer 30 made of silicon nitride (SiNx) is formed on gate wire (22a, 22b, 26a, 26b) and storage electrode wire (28a, 28b, 29a, 29b). A pair of semiconductor layers, i.e., first and second semiconductor layers 40a and 40b, made of hydrogenated amorphous silicon or polycrystalline silicon are formed over the gate insulating layer 30. The first and second semiconductor layers may be formed in various shapes such as an island shape or a stripe shape, and, for example, may be formed in an island shape extending over gate electrodes 26a and 26b under a data line 62 as illustrated in the current embodiment. When the first and second semiconductor layers 40a and 40b are formed in a stripe shape, they may be disposed under the data line 62 and extend up to the gate electrodes 26a and 26b.

A pair of ohmic contact layers, i.e., first and second ohmic contact layers (not shown), which are made of silicide or n+amorphous silicon hydride in which an n-type impurity is highly doped, are formed on the first and second semiconductor layers 40a and 40b.

Data line 62 and first and second drain electrodes 66a and 66b are formed on the first and second ohmic contact layers and the gate insulating layer 30. Data line 62, for transmitting data voltages, extends in a longitudinal direction and intersects the first and second gate lines 22a and 22b. First and second source electrodes 65a and 65b extending toward the first and second drain electrodes 66a and 66b are formed from the data line 62. First and second drain electrodes 66a and 66b, which are respectively positioned on the first and second semiconductor layers 40a and 40b, are separated from and opposite to the first and second source electrodes 65a and 65b in view of the first and second gate electrodes 26a and 26b, respectively. First and second drain electrodes 66a and 66b are formed to overlap with the first and second storage electrodes 29a and 29b in a state in which the gate insulating layer 30 is positioned therebetween, thereby forming a storage capacitor.

Data line 62, first and second source electrodes 65a and 65b, and first and second drain electrodes 66a and 66b constitute a data wire (62, 65a, 65b, 66a, 66b).

Data wire (62, 65a, 65b, 66a, 66b) is preferably formed of a refractory metal such as chromium (Cr), molybdenum (Mo)-containing metal, tantalum (Ta) or titanium (Ti). That is, the data wire (62, 65a, 65b, 66a, 66b) may be formed as a single layer or a multiple layer including a lower film (not shown) made of a refractory metal film and a low-resistivity upper film (not shown). Examples of multiple layers include a double-layered structure having a lower Cr (Cr alloy) film and an upper Al (Al alloy) film, a double-layered structure having a lower Al (Al alloy) film and an upper Mo (Mo alloy) film, and a triple-layered structure having a lower Mo film, an intermediate Al film, and an upper Mo film.

At least a portion of the first and second source electrodes 65a and 65b overlap with the first and second semiconductor layers 40a and 40b, and at least a portion of the first and second drain electrodes 66a and 66b facing the first and second source electrodes 65a and 65b overlap with the first and second semiconductor layers 40a and 40b. Here, the first and second ohmic contact layers are interposed between the first and second semiconductor layers 40a and 40b, which lie under the first and second ohmic contact layers, and the first and second source electrodes 55a and 55b and the first and second drain electrodes 66a and 66b, which lie on top of the first and second ohmic contact layers. The first and second ohmic contact layers reduce the contact resistance between the layers above and below them.

First and second drain electrodes 66a and 66b have stripe-shaped ends overlapping with the first and second semiconductor layers 40a and 40b and the first and second drain electrode pads 67a and 67b, which are relatively wide and extend from the ends to overlap with the first and second storage electrodes 29a and 29b.

First and second source electrodes 65a and 65b are formed in the form of branches, and are extended to cover the ends of the first and second drain electrodes 66a and 66b or bent to cover the ends of the first and second drain electrodes 66a and 66b.

A passivation layer 70 is formed on the data line 62, the first and second drain electrodes 66a and 66b and exposed portions of the first and second semiconductor layers 40a and 40b. Here, the passivation layer 70 is preferably made of an inorganic material such as silicon nitride or silicon oxide, a photosensitive organic material having a good flatness characteristic, or a low dielectric insulating material such as a-Si:C:O or a-Si:O:F formed by plasma enhanced chemical vapor deposition (PECVD). Alternatively, to protect the exposed semiconductor layers 40a and 40b and maintain the organic properties thereof, the passivation layer 70 may be formed as a double-layered structure having a lower inorganic layer and an upper organic layer.

Contact holes 76a and 76b are formed in the passivation layer 70 to expose the first and second drain electrode pads 67a and 67b, respectively.

First and second sub-pixel electrodes 82a and 82b are formed on a pixel area where the first and second sub-pixel electrodes 82a and 82b are electrically connected with the first and second drain electrodes 66a and 66b through the contact holes 76a and 76b, respectively. The first and second sub-pixel electrodes 82a and 82b are formed at every pixel to form a pixel electrode. The first and second sub-pixel electrodes 82*a* and 82*b* are made of a transparent conductor such as ITO or IZO or a reflective conductor such as Al. The pixel electrode constituted by the first and second sub-pixel electrodes 82*a* and 82*b* is substantially in a zigzag pattern.

The first and second sub-pixel electrodes 82*a* and 82*b* are physically and electrically connected to the first and second drain electrodes 66*a* and 66*b* via the contact holes 76*a* and 76*b* and receive data voltages from the first and second drain electrodes 66*a* and 66*b*.

The pixel electrode is partitioned into the first and second sub-pixel electrodes 82*a* and 82*b*. The first sub-pixel electrode 82*a* is driven by a first thin film transistor comprising first drain electrode 66*a*, first source electrode 65*a* and first gate electrode 22*a*. The second sub-pixel electrode 82*b* is driven by a second thin film transistor comprising second drain electrode 66*b*, the second source electrode 65*b* and the second gate electrode 22*b*.

A pair of gray voltage sets having different gamma curves obtained from information about an image is applied to the first and second sub-pixel electrodes 82*a* and 82*b*. The gamma curve of a pixel corresponds to a combination of the gamma curves. To determine the pair of gray voltage sets to be applied to a pixel electrode, a gamma curve resulting after combining the gamma curves at a front side of a pixel is made similar to a reference gamma curve at the front side. In addition, a gamma curve resulting after combining the gamma curves at lateral sides is made similar to the reference gamma curve at the front side. By doing so, the lateral visibility is improved.

A pixel electrode, which is shaped substantially in a zigzag pattern, is formed on the aforementioned passivation layer 70. The pixel electrode will now be described in greater detail with reference to FIGS. 1B and 1C.

Figure 1B:
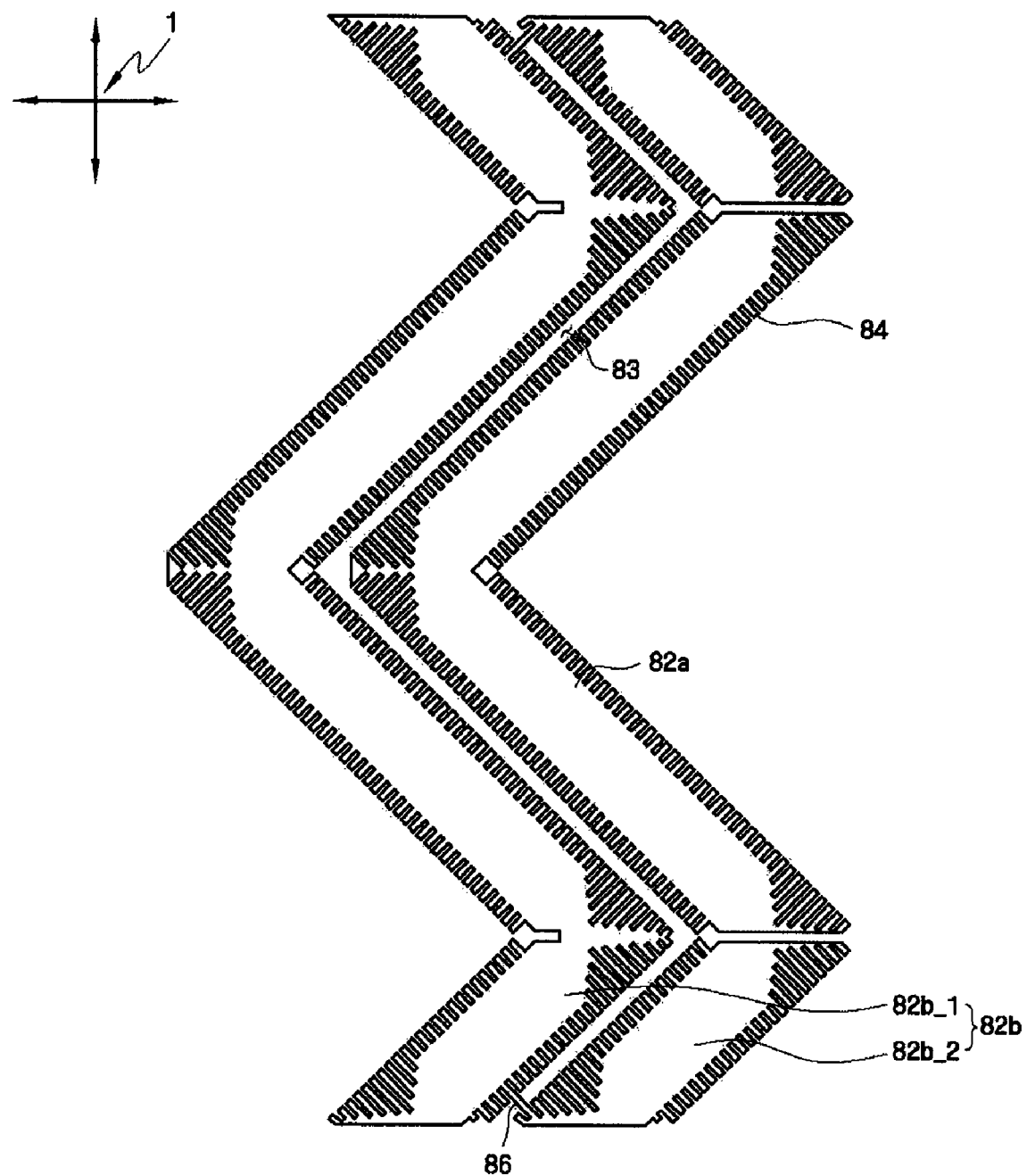
FIG. 1B is a layout diagram of a pixel electrode shown in FIG. 1A.
Figure 1C:
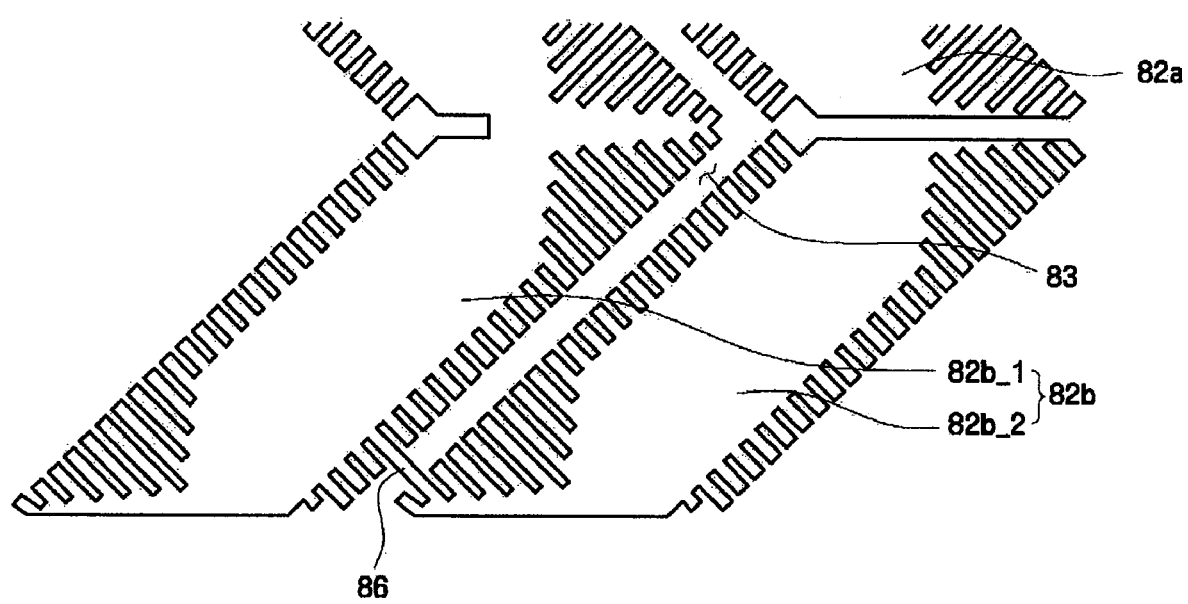
FIG. 1C is an enlarged layout diagram illustrating a connecting portion of the pixel electrode shown in FIG. 1A.

As shown in FIGS. 1B and 1C, the pixel electrode comprising the first and second sub-pixel electrodes 82*a* and 82*b* advantageously has three corners but the invention is not limited to the number of bent portions illustrated. The pixel electrode includes a first sub-pixel electrode 82*a*, a second sub-pixel electrode 82*b* surrounding all of the first sub-pixel electrode 82*a* except for one side of the first sub-pixel electrode 82*a*.

The first sub-pixel electrode 82*a* and the second sub-pixel electrode 82*b* are electrically disconnected from each other by a gap 83 extending in a substantially zigzag fashion. In detail, the gap 83 is composed of a portion forming an angle of approximately 45 degrees or −45 degrees with respect to the first or second gate line 22*a*, 22*b* or a transmissive axis 1 of a polarizing plate 2 (hereinafter, referred to as an oblique portion), and a portion extending at first and third bent portions in a transverse direction to electrically isolate the first sub-pixel electrode 82*a* from the second sub-pixel electrode 82*b* in a longitudinal direction (hereinafter, referred to as a horizontal portion).

The first sub-pixel electrode 82*a* is V-shaped. The second sub-pixel electrode 82*b* includes lateral electrode 82*b*_1 which is disposed at either side of the first sub-pixel electrode 82*a* and has substantially a three-cornered zigzag shape, and a pair of upper and lower electrodes 82*b*_2 disposed above and below the first sub-pixel electrode 82*a* and at either end of the lateral electrode 82*b*_1.

Serrated micro-patterns 84 are formed at edges of the first and second sub-pixel electrodes 82*a* and 82*b*. The serrated micro-patterns 84 strengthen a lateral electric field to thus facilitate movement of the liquid crystal molecules 310 of the liquid crystal layer 300. The micro-patterns 84 comprise a plurality of protrusions extending perpendicularly from the sides of the first and second sub-pixel electrodes 82*a* and 82*b*.

Accordingly, the plurality of protrusions constituting the micro-patterns 84 form an angle of approximately 45 degrees or −45 degrees with respect to the first or second gate line 22*a*, 22*b* or the transmissive axis 1 of the polarizing plate 2.

The lateral electrode 82*b*_1 and the upper and lower electrodes 82*b*_2, which constitute the second sub-pixel electrode 82*b*, are parallel with each other in a longitudinal direction and are separated from one another by the gap 83 except for a connecting portion 86. That is to say, the connecting portion 86 connects the micro-patterns 84 of the lateral electrode 82*b*_1 with the micro-patterns 84 of the upper and lower electrodes 82*b*_2. A data voltage applied to the lateral electrode 82*b*_1 is transmitted to the upper and lower electrodes 82*b*_2 through the connecting portion 86. Thus, a lateral electric field is also generated around the connecting portion 86. If the lateral electric field generated by the micro-patterns 84 in the vicinity of the connecting portion 86 is not substantially the same as the lateral electric field generated by the connecting portion 86, liquid crystal molecules arranged around the connecting portion 86 move in all directions in an irregular manner, resulting in the occurrence of textures. To avoid the occurrence of textures, the connecting portion 86 is preferably formed to extend in the same direction as the micro-patterns 84. In other words, at least a portion of the connecting portion 86 preferably forms an angle of approximately 45 degrees or −45 degrees with respect to the first or second gate line 22*a*, 22*b* or the transmissive axis 1 of the polarizing plate 2. In the current embodiment, a relatively high data voltage may be applied to the first sub-pixel electrode 82*a* and a relatively low data voltage may be applied to the second sub-pixel electrode 82*b*. Conversely, a relatively lower data voltage may be applied to the first sub-pixel electrode 82*a* and a relatively higher data voltage may be applied to the second sub-pixel electrode 82*b*. In order to improve visibility, it is advantageous for a pixel electrode to which a relatively low data voltage is applied to have a wide area. Accordingly, a higher data voltage is applied to the first sub-pixel electrode 82*a* and a lower data voltage is applied to the second sub-pixel electrode 82*b*. An alignment film (not shown) for alignment of the liquid crystal molecules 310 may be applied to the pixel electrode, i.e., the first sub-pixel electrode 82*a* and the second sub-pixel electrode 82*b* and the passivation layer 70.

Figure 2:
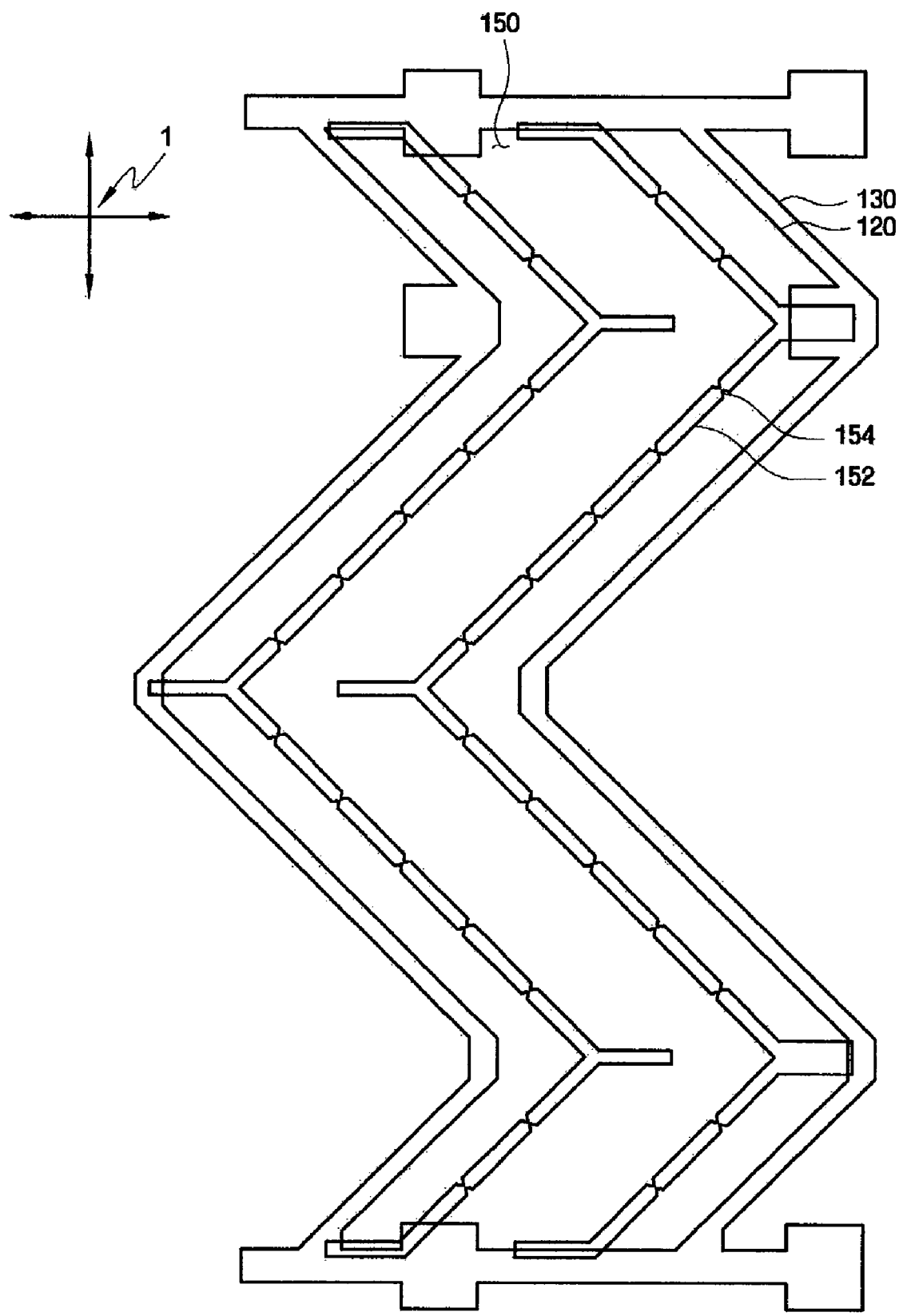
FIG. 2 is a layout diagram of a common electrode plate of a liquid crystal display according to an embodiment of the present invention.

Hereinafter, a common electrode plate will be described with reference to FIGS. 2 through 4.

A black matrix 120 for preventing light leakage and red, green, and blue color filters 130 sequentially arranged to form a unit pixel, are formed on an insulating substrate 110 which is made of a transparent insulating material, such as glass. An overcoat layer 140, which is made of an organic material, is formed over the color filters 130. A common electrode 150, which is made of a transparent conductive material such as ITO or IZO and has a domain divider 152, is formed on the overcoat layer 140.

Common electrode 150, which faces pixel electrode 82*a*, 82*b*, has the domain divider 152 forming an angle of approximately 45 degrees or −45 degrees with respect to the gate lines 22*a* and 22*b* or the transmissive axis 1 of the polarizing plate 2. The domain divider 152 is bent in such a way that a unit pixel is bent. That is to say, the domain divider 152 is disposed at the center of the first sub-pixel electrode 82*a* and the lateral electrode 82*b*_1 and the upper and lower electrodes 82*b*_2 of the second sub-pixel electrode 82*b*. The domain divider 152 may be formed in the form of a plurality of cutouts or protrusions provided in the common electrode 150. In addition, the domain divider 152 may divide a pixel into a plurality of domains which determine the alignment directions of the liquid crystal molecules 310. Accordingly, it is possible to increase the reference viewing angle by distributing the alignment directions of liquid crystal molecules 310 into various directions using the domain divider 152. As used herein, the term "domain" means a region containing liquid crystal molecules 310 whose directions are aligned in a predetermined direction when an electric field is applied to the liquid crystal layer 300 formed by the liquid crystal molecules 310.

The domain divider 152 has a chamfer-shaped notch 154. The notch 154 may have a triangular, rectangular, trapezoidal, or semicircular shape. The notch 154 allows the liquid crystal molecules 310 around boundaries of domains to be arranged in regular and stable patterns, thereby preventing black and white stripes, i.e., staining, or afterimage, from being generated around the boundaries of domains.

The black matrix 120 is formed along the periphery of the pixel electrode 82a, 82b. The color filter 130 is elongated in a longitudinal direction, that is, in a column direction of the pixel, and is periodically bent to conform to the shape of the pixel.

An alignment film (not shown) for alignment of the liquid crystal molecules 310 may be coated on the common electrode 150.

The above-described TFT array plate 100, common electrode plate 200 and the liquid crystal layer 300 interposed therebetween are vertically aligned and assembled to complete the liquid crystal display having the basic structure according to an embodiment of the present invention. The liquid crystal display having the basic structure may further include additional elements including a polarizing plate, a backlight, and the like. In this case, the polarizing plate, i.e., a pair of polarizers, may be attached to opposite sides of the liquid crystal display having the basic structure. In addition, the transmissive axis 1 of one of the pair of polarizers is substantially parallel with the gate lines 22a and 22b and the transmissive axis 1 of the other of the pair of polarizers is substantially perpendicular to the gate lines 22a and 22b.

The liquid crystal molecules 310 in the liquid crystal layer 300 are aligned such that their directions are substantially perpendicular to TFT array plate 100 and the color filter plate 200 when there is no electric field applied between TFT array plate 100 and the color filter plate 200. The liquid crystal layer 300 has negative dielectric anisotropy. TFT array plate 100 and the color filter plate 200 are aligned such that the pixel electrode 82a, 82b completely overlaps with the corresponding color filter 130. In such a manner, an area of the pixel is divided into multiple domains by the domain divider 152 of the common electrode 150 and the gap 83 of the pixel electrode 82a and 82b.

In more detail, as shown in FIG. 4, when an electric field is applied to the liquid crystal layer 300, the liquid crystal molecules 310 in each domain are tilted in a direction perpendicular to the lateral sides of the domain. For example, the liquid crystal molecules 310 in a domain D1 are tilted rightward and the liquid crystal molecules 310 in a domain D2 are tilted leftward. That is to say, the liquid crystal molecules 310 arranged in the domain D1 are tilted rightward due to a lateral electric field generated by the domain divider 152 of the common electrode 150 and lateral sides of the second sub-pixel electrode 82b. The liquid crystal molecules 310 arranged in the domain D2 are tilted leftward due to a lateral electric field generated by the domain divider 152 and the gap 83 of the first and second sub-pixel electrodes 82a and 82b. The liquid crystal molecules 310 arranged in a domain D3 are tilted rightward due to a lateral electric field generated by the domain divider 152 of the common electrode 150 and the gap 83 of the first and second sub-pixel electrodes 82a and 82b. The liquid crystal molecules 310 arranged in a domain D4 are tilted leftward due to a lateral electric field generated by the domain divider 152 of the common electrode 150 and lateral sides of the first sub-pixel electrode 82a. When the liquid crystal molecules 310 are tilted by the lateral electric field in the above-described manner, the serrated micro-patterns 84 formed at the edges of the first and second sub-pixel electrodes 82a and 82b strengthen the lateral electric field.

Figure 5:
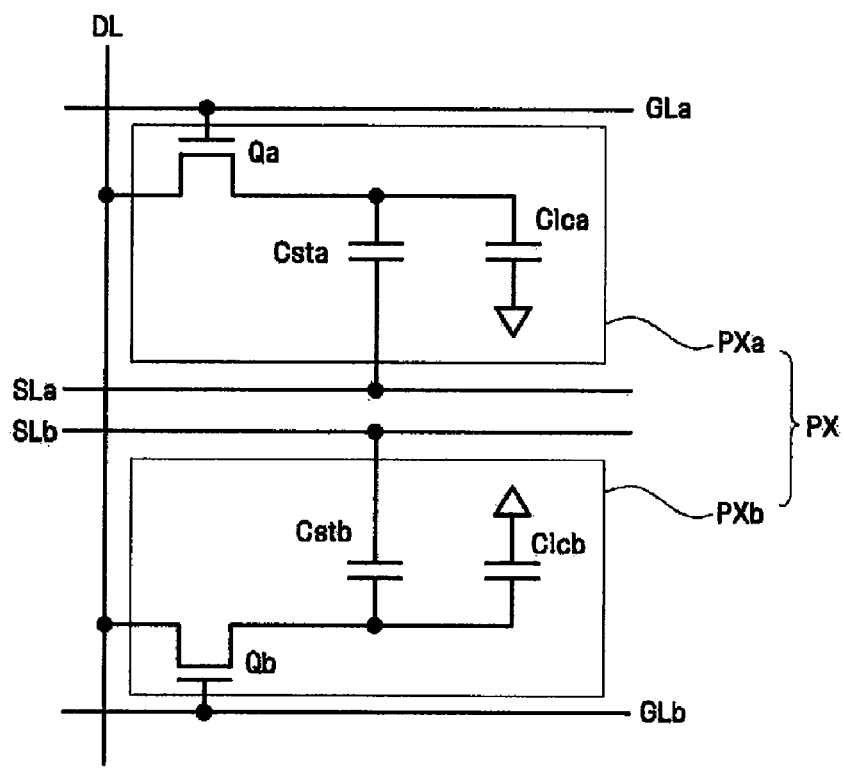
FIG. 5 is a circuit diagram of the liquid crystal display according to an embodiment of the present invention.

FIG. 5 is a circuit diagram of the liquid crystal display according to an embodiment of the present invention. In FIG. 5, GLa denotes the first gate line, GLb donates the second gate line, DL denotes the data line, SLa denotes the first storage electrode line, SLb denotes the second storage electrode line, PXa denotes a first sub pixel derived from the first sub-pixel electrode, and PXb denotes a second sub pixel derived from the second sub-pixel electrode.

A pixel PX includes a pair of sub pixels PXa and PXb. The sub pixels PXa and PXb include switching elements Qa and Qb connected to the data line DL and the corresponding gate lines GLa and GLb, liquid crystal capacitors Clca and Clcb connected to the switching elements Qa and Qb, and storage capacitors Csta and Cstb connected to the switching elements Qa and Qb and the storage electrode lines SLa and SLb, respectively. Formation of the storage capacitors Csta and Cstb or the storage electrode lines SLa and SLb may be omitted. Here, the storage electrode lines SLa and SLb may not be formed.

As previously described, a pair of gray voltage sets having different gamma curves obtained from information about an image are applied to the pair of sub pixels PXa and PXb. The gamma curve for a pixel corresponds to a combination of gamma curves. In determining a pair of gray voltage sets applied to a pixel electrode, a gamma curve resulting after combining the gamma curves at a front side is made similar to a reference gamma curve at the front side. In addition, a gamma curve resulting after combining the gamma curves at lateral sides is made similar to the reference gamma curve at the front side. By doing so, lateral visibility is improved.

Figure 6:
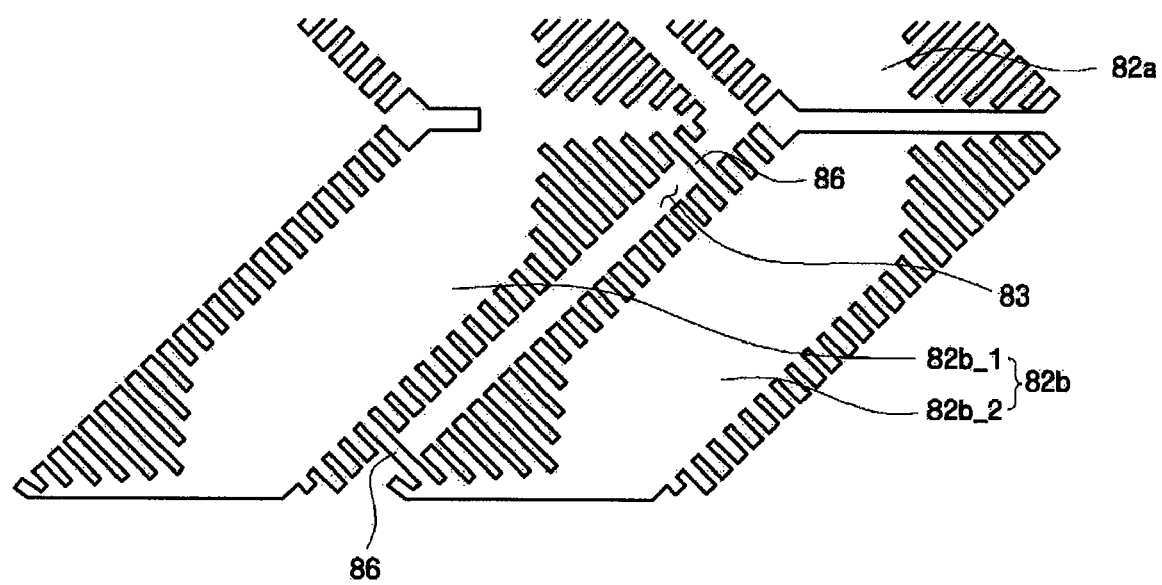
FIG. 6 is a layout diagram of a pixel electrode of a liquid crystal display according to another embodiment of the present invention.

Hereinafter, a liquid crystal display according to another embodiment of the present invention will be described with reference to FIG. 6. FIG. 6 is a layout diagram of a pixel electrode of a liquid crystal display according to another embodiment of the present invention, illustrating a modified example of the pixel electrode shown in FIG. 1C. For convenience of explanation, components each having the same function for describing the embodiments shown in FIGS. 1A through 5 are respectively identified by the same reference numerals, and their repetitive description will be omitted. The liquid crystal display according to the current embodiment shown in FIG. 6 basically has the same configuration as that of the previous embodiment except for the following.

To avoid electrical disconnection between upper and lower electrodes 82b_2 and lateral electrode 82b_1 due to damage caused to a connecting portion 86 therebetween, a plurality of connecting portions are formed. That is, a plurality of connecting portions 86 are provided, as shown in FIG. 6. To prevent textures occurring around the connecting portions 86, at least a portion of the connecting portion 86 preferably forms an angle of approximately 45 degrees or −45 degrees with respect to gate lines or a transmissive axis of a polarizing plate.

As described above, in a liquid crystal display according to the present invention, two sub pixels are formed in a pixel and different data voltages are applied to the two sub pixels, thereby improving lateral visibility. In addition, the response speed of the liquid crystal molecules is increased by forming serrated micro-patterns at the edges of the sub-pixel electrodes. Further, the occurrence of textures around connecting portions of the sub-pixel electrodes can be prevented by making at least a portion of the connecting portion form an angle of approximately 45 degrees or −45 degrees with respect to a transmissive axis of a polarizing plate, thereby enhancing the luminance.

While the present invention has been particularly shown and described with reference to exemplary embodiments thereof, it will be understood by those of ordinary skill in the art that various changes in form and details may be made therein without departing from the spirit and scope of the present invention.

What is claimed is:

1. A liquid crystal display comprising:
   first and second gate lines separated from each other and extending in a first direction;
   data lines insulated from the first and second gate lines and extending in a second direction, wherein the data lines and the gate lines intersect each other;
   first and second thin film transistors connected to the first and second gate lines and the data lines, respectively;
   a first sub-pixel electrode connected to the first thin film transistor;
   a second sub-pixel electrode connected to the second thin film transistor, the second sub-pixel electrode including a pair of upper and lower electrodes disposed above and below the first sub-pixel electrode and lateral electrode disposed at one side of the first sub-pixel electrode and the upper and lower electrodes, the lateral electrode comprising at least one first serrated pattern formed at an edge thereof and the upper and lower electrodes comprising at least one second serrated pattern formed at an edge thereof; and
   a connecting portion connecting the first serrated pattern and the second serrated pattern, at least a portion of the connecting portion forming an angle of substantially 45 degrees or −45 degrees with respect to the gate lines.

2. The liquid crystal display of claim 1, wherein the first and second sub-pixel electrodes are shaped substantially in a zigzag pattern.

3. The liquid crystal display of claim 2, wherein the first sub-pixel electrode is V-shaped, and the lateral electrode of the second sub-pixel electrode is disposed at either side of the first sub-pixel electrode and has substantially a three-cornered zigzag shape.

4. The liquid crystal display of claim 2, wherein lateral sides of the first and second sub-pixel electrodes form an angle of substantially 45 degrees or −45 degrees with respect to the gate lines.

5. The liquid crystal display of claim 1, wherein serrated micro-patterns are formed at edges of the first and second sub-pixel electrodes.

6. The liquid crystal display of claim 5, wherein the serrated micro-patterns comprise a plurality of protrusions extending perpendicularly from the sides of the first and second sub-pixel electrodes.

7. The liquid crystal display of claim 6, wherein the plurality of protrusions form an angle of substantially 45 degrees or −45 degrees with respect to the gate lines.

8. The liquid crystal display of claim 5, wherein the connecting portion connects the micro-patterns formed at the lateral electrode with the micro-patterns formed at the upper and lower electrodes.

9. The liquid crystal display of claim 8, wherein the connecting portion extends in substantially the same direction as the micro-patterns.

10. The liquid crystal display of claim 8, wherein the connecting portion comprises a plurality of connecting portions.

11. The liquid crystal display of claim 1, wherein the first and the second serrated patterns are extended perpendicularly from the edge of the lateral electrode and the upper and lower electrodes, respectively.

12. A liquid crystal display comprising:
    first and second gate lines separated from each other and extending in a first direction;
    data lines insulated from the first and second gate lines and extending in a second direction, wherein the data lines and the gate lines intersect each other;
    first and second thin film transistors connected to the first and second gate lines and the data lines, respectively;
    a first sub-pixel electrode connected to the first thin film transistor and having micro-patterns formed at its edges;
    a second sub-pixel electrode connected to the second thin film transistor and having micro-patterns formed at its edges, the second sub-pixel electrode including a pair of upper and lower electrodes disposed above and below the first sub-pixel electrode and lateral electrode disposed at one side of the first sub-pixel electrode and the upper and lower electrodes; and
    a connecting portion connecting the micro-patterns formed at the lateral electrode with the micro-patterns formed at the upper and lower electrodes,
    wherein the first and second sub-pixel electrodes are shaped substantially in a zigzag pattern,
    wherein the micro-patterns are serrated and the micro-patterns comprise a plurality of protrusion extending perpendicularly from the sides of the first and second sub-pixel electrodes.

13. The liquid crystal display of claim 12, wherein the first sub-pixel electrode is V-shaped, and the lateral electrode of the second sub-pixel electrode is disposed at either side of the first sub-pixel electrode and has substantially a three-cornered zigzag shape.

14. The liquid crystal display of claim 12, wherein lateral sides of the first and second sub-pixel electrodes form an angle of substantially 45 degrees or −45 degrees with respect to the gate lines.

15. The liquid crystal display of claim 12, wherein the plurality of protrusions form an angle of substantially 45 degrees or −45 degrees with respect to the gate lines.

16. The liquid crystal display of claim 12, wherein the connecting portion extends in substantially the same direction as the micro-patterns.

17. The liquid crystal display of claim 16, wherein at least a portion of the connecting portion forms an angle of substantially 45 degrees or −45 degrees with respect to the gate lines.

18. The liquid crystal display of claim 12, wherein the connecting portion comprises a plurality of connecting portions.

* * * * *